Feb. 19, 1952  S. B. McLEOD  2,586,683
SOLENOID VALVE ASSEMBLY
Filed Sept. 8, 1947
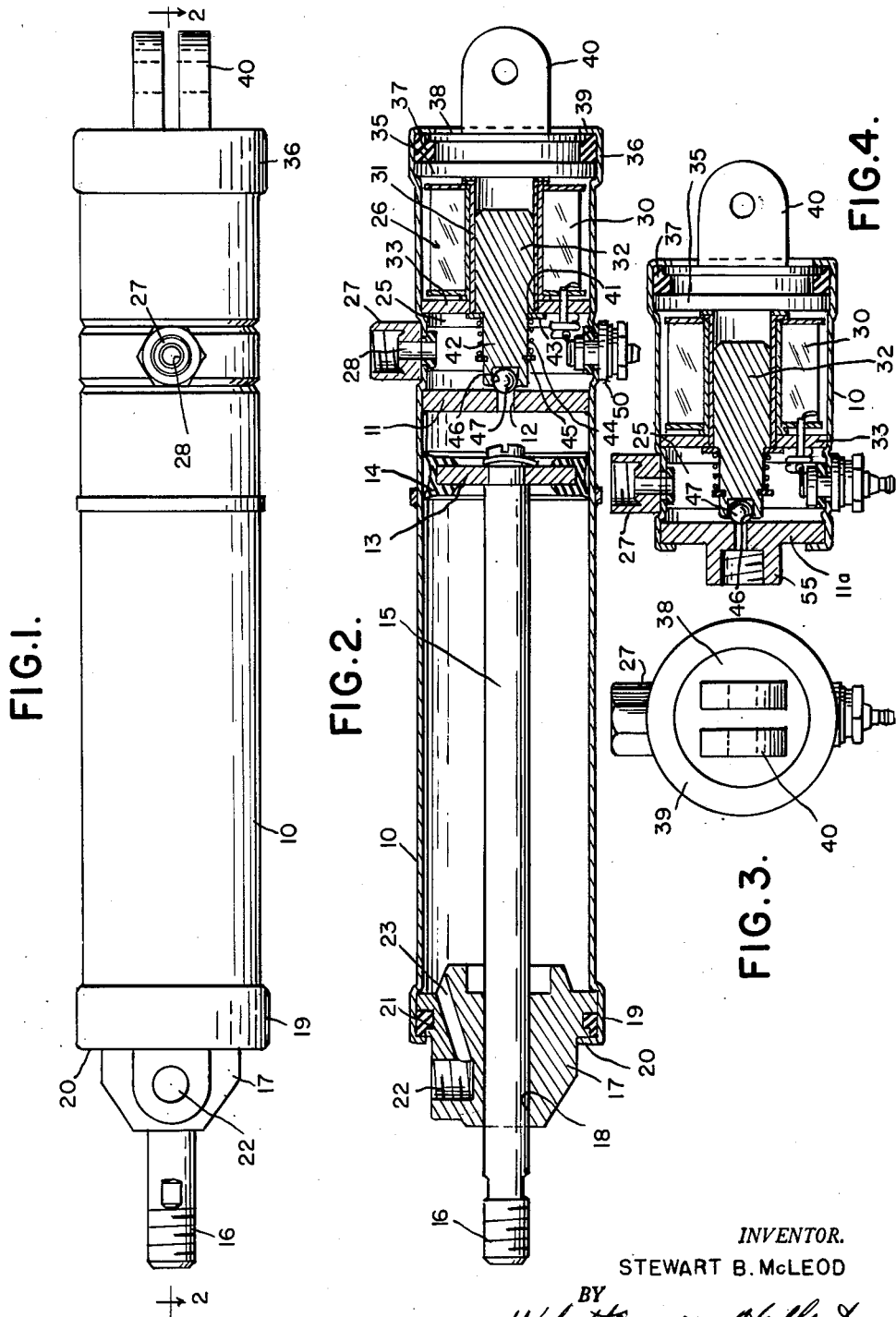
*INVENTOR.*
STEWART B. McLEOD
BY
Whittemore, Hulbert
& Belknap   ATTORNEYS Patented Feb. 19, 1952

2,586,683

UNITED STATES PATENT OFFICE 2,586,683

SOLENOID VALVE ASSEMBLY

Stewart B. McLeod, Dearborn, Mich., assignor, by mesne assignments, to Detroit Harvester Company, Detroit, Mich., a corporation of Michigan Application September 8, 1947, Serial No. 772,697

4 Claims. (Cl. 137—139)

1

The present invention relates to a cylinder and solenoid valve assembly.

It is an object of the present invention to provide a self-contained solenoid valve assembly.

It is a further object of the present invention to provide a self-contained solenoid valve assembly in which the solenoid valve actuator assembly serves as a closure for the valve casing.

It is a further object of the present invention to provide a solenoid actuated valve assembly comprising a tubular valve housing open at one end in combination with a solenoid actuator subassembly adapted to be received within the open end of the valve housing and to serve as a closure means therefor.

It is a further object of the present invention to provide a combination cylinder and solenoid valve assembly in which the parts are arranged with a view to simplifying and reducing the expense of the complete assembly and improving the efficiency of its operation.

It is a further object of the present invention to provide a cylinder and solenoid valve assembly arranged to afford a positive lock preventing actuation of the mechanism operated thereby when the solenoid is deenergized.

It is a further object of the present invention to provide a cylinder and solenoid valve assembly arranged to prevent manual piston movement when the solenoid is deenergized, but which permits escape of fluid from the cylinder as a result of thermal expansion.

It is a feature of the present invention to provide a cylinder and solenoid valve assembly comprising a tubular casing having a partition extending thereacross provided with an opening serving as a valve seat, a piston located within one end of said casing, a valve element in said casing at the opposite side of said partition from said piston, and a solenoid valve controlling subassembly received within the last mentioned end of said casing, cooperatively associated with said valve element, and serving to close and seal the open end of said casing.

Other objects and features of the invention will become apparent as the description proceeds, especially when considered in conjunction with the accompanying drawings, wherein:

Figure 1 is a side elevation of the complete cylinder and solenoid valve assembly;

Figure 2 is a longitudinal section taken on the line 2—2 of Figure 1;

Figure 3 is a right-hand end elevation of the assembly shown in Figure 1; and

Figure 4 is a sectional view similar to Figure 3

2 of a modified solenoid actuated valve in which the piston and cylinder construction is omitted.

Referring first to Figures 1 to 3, there is illustrated a cylinder and solenoid valve assembly adapted to be connected into a hydraulic system preferably of the type in which a hydraulic pump is included and is adapted to be selectively operated in forward or reverse directions to control flow of fluid through the system. Systems of this type may find a wide variety of usages, but by way of example they are particularly useful in hydraulic window lift installations for automotive vehicles.

As applied to a hydraulic window or other closure actuator lift, it is desirable that means be provided in the system effective to insure against flow of fluid when the pump is not energized and this means should be so arranged that it prevents the flow of fluid which would result from lowering of the window of the vehicle. Thus, the system referred to effects positive closure of the window and prevents lowering of the window by the application of force directly to the window, thereby preventing unauthorized persons from gaining access to the interior of the vehicle.

With the foregoing general description in mind, it will be observed that the hydraulic system illustrated is effective to carry out this purpose, as will presently appear.

The assembly comprises a tubular casing or housing 10 having its ends open and provided with an intermediate partition 11 which is provided with a valve opening or passage 12 therethrough. To one side of the partition 11 the casing 10 forms an operating cylinder in which is slidably received a piston 13, which as illustrated is provided with an annular sealing ring 14 of U-shaped cross section. A piston rod 15 is suitably secured to the piston and extends outwardly beyond the open end of the casing 10, at which point it is provided with threads as indicated at 16 for connection to mechanism to be operated thereby. A block 17 is secured in the end of the cylinder 10 and has a cylindrical opening 18 extending therethrough which serves as a guide for the piston rod 15. The block 17 is retained in place in an outwardly extending annular portion 19 of the casing which terminates in an inwardly directed flange 20. Suitable sealing means such as the gasket indicated at 21 are preferably provided. Extending through the block 17 is a fluid passage comprising a drilled and tapped opening 22 communicating with an intersecting drilled passage 23.

At the opposite end of the casing 10 is a valve chamber 25 which is formed between the partition 11 and a solenoid valve actuating subassembly indicated generally at 26. Means are provided for connecting the valve chamber 25 into the hydraulic system and this means may conveniently take the form of an internally threaded nipple 27 secured to the casing and having a passage 28 extending therethrough.

The solenoid valve actuating subassembly comprises a solenoid winding 30 formed about a central sleeve 31 which sleeve slidably receives the solid solenoid core or plunger 32. At the inner end of the sleeve 31 is an annular mounting plate 33 by means of which the solenoid subassembly is mounted within the open end of the casing 10 and which serves to locate valve 47 in alignment with the valve port formed by opening 12.

At the opposite end of the sleeve 31 is a disk 35 received in an outwardly extending annular portion 36 of the casing 10. The disk 35 is rigidly secured to the sleeve 31 and forms additional means for supporting the solenoid subassembly within the open end of the casing 10. As indicated in Figure 2, the solenoid subassembly is sealed and retained in the open end of the casing 10 by means of a gasket 37. In use the device is connected to a suitable support by bifurcated, apertured ears 40, extending outwardly from a plate 38 secured in the casing by an inwardly extending flange 39.

The solenoid core is shouldered as indicated at 41 so as to provide a projecting portion 42 of reduced cross section. A washer 43 slidably receives the reduced portion 42 and serves as a seat for a compression spring 44 which at its opposite end bears against a thrust washer 45 seated in a groove in the reduced portion 42 of the plunger. The arrangement just described provides means for constantly urging the plunger 32 to the left, as seen in Figure 2. At the same time, it permits movement of the plunger 32 to the right when the solenoid winding 30 is energized.

At the end of the reduced portion 42, the plunger is provided with a cup 46 for the reception of a ball valve 47. The ball valve 47 is permanently retained in rigid position in the cup by suitable means, such for example as by swedging the edges of the cup into engagement with the ball.

The solenoid core or plunger 32 is freely slidable within the sleeve 31 and in fact has a certain amount of clearance with respect thereto, this clearance being deliberately provided to permit accurate centering of the ball valve 47 on the valve seat formed by the valve opening 12.

At 50 there is indicated an electrical connection to the winding, which forms no part of the present invention.

In order that the utility of the construction just described may be fully appreciated, it may be pointed out that the structure is connected into a closed hydraulic system which includes a reversible fluid pump preferably actuated by an electric motor or a fluid motor provided with valve means for controlling the direction of flow in a reversible manner. Electrical connections, not shown and which form no part of the present invention, interconnect the solenoid and the electric motor in such manner that when the motor is energized to cause a flow of fluid into the cylinder at the selected side of the piston 13, the solenoid windings 30 will be energized just slightly before the flow of fluid is initiated in the casing 10. Energization of the windings 30 as previously described causes movement of the solenoid core 32 to the right, thus withdrawing the ball valve 47 from the valve seat formed by the valve opening 12. Accordingly, flow of fluid through the valve opening 12 in either direction is permitted.

In case the construction just described is connected to actuate a hydraulic lift mechanism for automobile windows, it is preferably mounted in vertical position with the threaded end 16 of the connecting rod 15 uppermost and connected so that flow of fluid to the casing 10 is into the passage 28 as the window is raised, thereby resulting in upward movement of the piston 13 (or to the left as seen in Figure 2) with resulting displacement of fluid at the other side of the piston out of passages 22, 23.

After raising the window and when the pump is deenergized, the solenoid winding 30 is also deenergized and the valve 47 is returned to its seat by the compression spring 44. At this time if downward force is applied to the window, as in the case of an attempt at unauthorized entry into the vehicle, pressure will be built up within the cylinder below piston 13, and since the ball valve 47 at this time is held on its seat by the compression spring 44, fluid is prevented from passing through the valve opening 12. Accordingly, the window is firmly locked by hydraulic means against downward movement.

While the pressure of the spring 44 is sufficient to prevent unauthorized entry into the vehicle as aforesaid, it nevertheless may yield under higher pressures to serve as a pressure relief valve to prevent rupture of conduits or damage to the system. Thus, thermal expansion of fluid in the cylinder might at times exert a dangerously high pressure therein, but with the illustrated arrangement this pressure is relieved by lifting valve 47 from its seat, permitting the escape of sufficient fluid to relieve the pressure.

Referring now to Figure 4, there is illustrated an arrangement in which the same solenoid controlled valve actuating subassembly is employed but the device is not combined with the piston and cylinder as illustrated in the embodiment previously described.

Corresponding parts are given the same reference numeral in Figure 4 and accordingly will not be described again. In this embodiment of the invention the tubular housing or casing 10 is relatively short and the partition 11a which corresponds to the partition 11 of Figure 2 is formed with an interiorly threaded, outwardly extending nipple 55. Accordingly, the solenoid actuated valve illustrated in Figure 4 may be connected into a system in which the motor or power actuating device is of any desired type, either a piston and cylinder equivalent to that shown in Figure 2 but contained in a separate structure or an entirely different type of hydraulically actuated mechanism.

It is desired to emphasize the simplification and economies which result from the composite structure illustrated in Figures 1 to 3. The cylindrical casing 10 serves both as a cylinder for the power piston 13 and also as a portion of the valve chamber 25. The valve chamber 25 is completed by the provision of the apertured partition 11 and by the provision of the solenoid valve actuator which is mounted within the open end of the casing in a manner to close the same to complete the valve chamber 25. The simplicity and compactness of the structure offer further advantages and by combining the valve and piston and cylinder assembly in the same casing the number of hydraulic connections in a complete assembly is reduced and the likelihood of leakage correspondingly diminished. The use of the solid solenoid core 32 provides for greater effectiveness of the solenoid and insures certainty of operation of the valve 47 thereby.

The drawings and the foregoing specification constitute a description of the improved cylinder and solenoid valve assembly in such full, clear, concise and exact terms as to enable any person skilled in the art to practice the invention, the scope of which is indicated by the appended claims.

What I claim as my invention is:

1. An electrically actuated valve comprising a unitary tubular casing open at both ends, an inwardly extending annular shoulder in said casing facing one end thereof, a partition in said casing seated against said shoulder in sealed relation to said casing, said partition having an opening therethrough forming a valve seat, a pair of stepped inwardly extending annular shoulders in said casing facing the opposite end thereof, the inner shoulder of said pair being of reduced diameter compared with the outer, a solenoid valve actuator assembly in said casing, said assembly comprising a pair of stepped circular members seated against said pair of shoulders in sealing relation and a solenoid actuated valve cooperable with said valve seat, and a fluid port in the side of said casing intermediate said partition and the inner circular member of the solenoid valve actuator assembly.

2. An electrically actuated valve comprising a unitary tubular casing open at both ends, an inwardly extending annular shoulder in said casing facing one end thereof, a partition in said casing seated against said shoulder in sealed relation to said casing, said partition having an opening therethrough forming a valve seat, a pair of stepped inwardly extending annular shoulders in said casing facing the opposite end thereof, the inner shoulder of said pair being of reduced diameter compared with the outer, a solenoid valve actuator assembly in said casing, said assembly comprising a pair of stepped circular members seated against said pair of shoulders in sealing relation and a solenoid actuated valve cooperable with said valve seat, a mounting disc in said casing located outwardly from said solenoid valve actuator assembly, the end of said casing being turned inwardly to retain said mounting disc in place, mounting means projecting outwardly from said mounting disc beyond the end of said casing, anad a fluid port in the side of said casing intermediate said partition and the inner member of the solenoid valve actuator assembly.

3. An electrically actuated valve comprising a unitary tubular casing open at both ends, an inwardly extending annular shoulder in said casing facing one end thereof, a partition in said casing seated against said shoulder in sealed relation to said casing, said partition having an opening therethrough forming a valve seat, a pair of stepped inwardly extending annular shoulders in said casing facing the opposite end thereof, the inner shoulder of said pair being of reduced diameter compared with the outer, a solenoid valve actuator assembly in said casing, said assembly comprising a pair of stepped circular members seated against said pair of shoulders in sealing relation and a solenoid actuated valve cooperable with said valve seat, and a fluid port and an electric lead connection to the solenoid in the side of said casing intermediate said partition and the inner member of the solenoid valve actuator assembly.

4. An electrically actuated valve comprising a tubular casing having an inwardly extending annular shoulder in said casing facing one end thereof, a disc in said casing seated against said shoulder in sealed relation to said casing, said disc having an opening therethrough forming a valve seat, a pair of stepped inwardly extending annular shoulders in said casing facing the opposite end thereof, the inner shoulder of said pair being of smaller diameter than the other, a valve and solenoid actuator assembly in said casing, said assembly comprising a pair of stepped circular members seated against said pair of shoulders in sealing relation, a solenoid, and a valve actuated by the solenoid cooperable with said valve seat, and a fluid port in the side of said casing intermediate said disc and the inner circular member of said valve and solenoid actuator assembly.

STEWART B. McLEOD.

REFERENCES CITED

The following references are of record in the file of this patent:

UNITED STATES PATENTS

| Number | Name | Date |
|---|---|---|
| 393,596 | Westinghouse | Nov. 27, 1888 |
| 1,693,676 | Spinelle | Dec. 4, 1928 |
| 1,822,668 | Protzeller | Sept. 8, 1931 |
| 1,883,240 | Phelan | Oct. 18, 1932 |
| 2,366,121 | Martin-Hurst | Dec. 26, 1944 |
| 2,379,536 | MacKenzie | July 3, 1945 |
| 2,413,655 | Russel | Dec. 31, 1946 |
| 2,415,660 | Stettner | Feb. 11, 1947 |
| 2,432,859 | Carter | Dec. 16, 1947 |
| 2,439,863 | Rappl | Apr. 20, 1948 |
| 2,468,943 | Parsons | May 3, 1949 |

FOREIGN PATENTS

| Number | Country | Date |
|---|---|---|
| 620,332 | Germany | of 1935 |